May 17, 1966 K. F. LUFT 3,251,225
APPARATUS FOR MEASURING THE VELOCITY OF A FLOWING GAS
Filed July 1, 1963
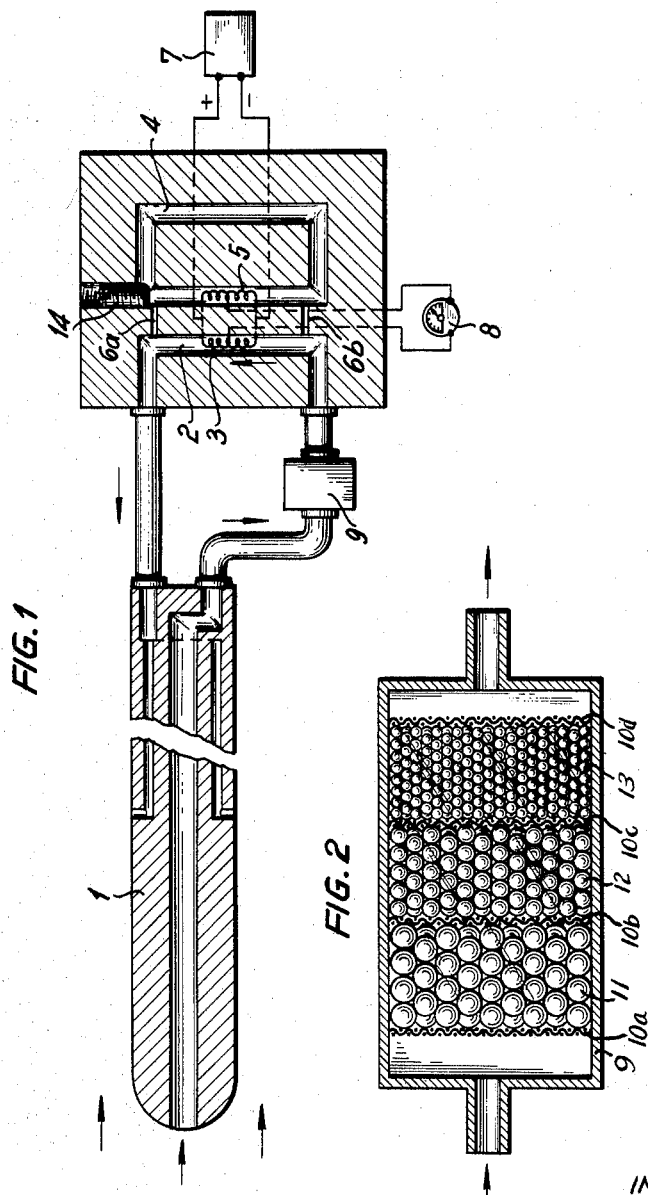
INVENTOR
Karl Friederich Luft
by Malcolm W. Fraser
attorney United States Patent Office 3,251,225
Patented May 17, 1966

3,251,225
APPARATUS FOR MEASURING THE VELOCITY
OF A FLOWING GAS
Karl Friedrich Luft, 39 An St. Albertus Magnus,
Essen, Germany
Filed July 1, 1963, Ser. No. 291,678
Claims priority, application Germany, July 5, 1962,
B 67,928
4 Claims. (Cl. 73—204)

This invention relates to apparatus for measuring the velocity of flowing gases and is particularly applicable to apparatus which makes it possible to measure small flow velocities of the air or atmosphere in mine workings.

The problem of accurately measuring small flow velocities, such as those below 1 m./sec., has not been satisfactorily solved hitherto. Measuring devices of the type conventionally employed for measuring higher flow velocities, such as anemometers for example, are not satisfactory for measuring small flow velocities. This is due to the fact that the mechanical adjusting forces are small with respect to the frictional forces and, furthermore, because of the influence of the moments of inertia at these velocities which cause errors of an unacceptable amount.

However, the measurement of small flow velocities is of great importance, particularly in mining, and above all in galleries of large cross-section, in which even a low velocity of air flow means that a comparatively high amount of mine air is flowing.

Low flow velocities have heretofore been measured with the aid of baffle or pressure elements or bodies, the measurement of the head of pressure being effected either directly or by way of the flow developing between pressure sampling parts or probes of the pressure element. In the case of very small flow velocities, however, the pressure heads are also very small, so that is becomes difficult to obtain an accurate result by this method, particularly when, as is generally the case in mining, the measuring apparatus is subjected to stringent requirements in respect of its strength and freedom from maintenance, which requirements are occasioned by the danger from firedamp, the dust content of the air and the confined space which is available below ground.

In carrying the invention into effect the pressure head is determined by electrical methods, with the aid of the transverse flow developing between the pressure sampling parts. The invention makes it possible to provide an easily transportable measuring apparatus which is adapted to the special conditions below ground and which, because of its insensitivity to influences interfering with the measurement and because of its simple structure, can be employed with advantage wherever low gas flow velocities have to be determined accurately under conditions which render the measurement difficult.

According to the invention there is provided apparatus from measuring the velocity of a flowing gas, in particular the velocity of air in mine workings, by determining a pressure head established by the flowing gas or air between two flow-sampling parts of a pressure element, the apparatus comprising two uniformly heated electrical conductors, one of which is disposed in a main flow system extending between the pressure-sampling parts of the pressure element and the other of which is disposed in a secondary flow system which is in parallel with the said main flow system, one half of each conductor forming one branch of a bridge circuit.

The measuring apparatus according to the invention is based on the concept of unbalancing the bridge circuit by disturbing the temperature equilibrium in the measuring arrangement and is therefore capable of measuring quickly even very small flow velocities. The manipulation thereof is extremely simple, because it is not important to hold the apparatus in a particular position during the measuring operation since within the limits of 10 to 15% required in practice, the pressure head is not dependant on the inclination of the pressure element and since, the comparison conductor is disposed externally of the flow to be measured, it compensates automatically for any dependence of the measuring result on inclination. This property of the apparatus provided by the invention is of decisive importance for the measurement of air velocities underground, because a pre-determined position of the measuring apparatus with respect to the direction of flow can be maintained only in exceptional cases.

According to an optional feature of the invention, the parallel flow circuit is preferably connected to the main flow circuit of the pressure body by way of capillaries, the arrangement preferably being such that the flow resistance of the parallel flow circuit is adjustable.

As the reading of the measuring apparatus for a given head of pressure depends on the flow resistance of the flow circuit consisting of connecting ducts and flow meter, care must be taken that this flow resistance does not change as it may do owing, in particular, to the accumulation of dust. For this reason, according to a further optional feature of the measuring apparatus provided by the invention, there may be inserted in the flow circuit of the pressure element a filter whose flow resistance is smaller than that of the flow circuit of the pressure element. Such a filter ensures almost complete separation of the dust contained in the atmosphere, which dust would otherwise result, on account particularly of thermal deposition, in very rapid fouling of the measuring system and thereby in falsification of the measuring result.

According to a further feature of the invention, it is particularly advantageous for the filter to consist of a plurality of separate layers of balls provided with an adhesive coating, the diameter of the balls decreasing from one layer to the next in the direction of flow.

Conventional filters are not usable in the apparatus of the invention owing to their high flow resistance, which is dependent on the dust charge, whereas the filter described herein has such a high degree of separation that such dust as is still allowed through does not cause any substantial fouling of the measuring apparatus even over a long period of time.

Measuring results have been obtained with measuring apparatus constructed in accordance with the invention which are far superior to measurements made with other apparatus as regards their accuracy. It has been found that continuous measurement of flow velocities down to a few centimetres per second is possible without any difficulty.

The electric power required for operating apparatus constructed in accordance with the invention is so small that it fulfills the conditions for inherently safe circuits i.e. the power is of an order of magnitude which is not sufficient for igniting firedamp mixtures. The apparatus is therefore particularly suitable for use in mining, because it can also be employed in an atmosphere containing an ignitable mixture without the risk of triggering an explosion.

The invention will now be described more fully, by way of example only, with reference to the accompanying drawings in which:

FIG. 1 shows diagrammatically and partly in section, one form of measuring apparatus according to the invention, and FIG. 2 shows a detail of FIGURE 1, namely the construction of a filter which forms part of the flow circuit of the apparatus of FIG. 1.

Referring to the drawings, a Brandtl pressure tube 1 is connected to a thermal flow measuring means 3, which consists of, for example, a spiral of fine platinum or nickel wire freely suspended in a passage or tube 2 and embedded in a thin layer of plastic. Parallel to the measuring tube 2 lies a closed circuit 4 provided with similarly constructed flow measuring means 5. Communication between the tube 2 and the circuit 4 is established by way of capillaries 6a and 6b the bore of which is so chosen that, owing to the extremely high flow resistance, the flow in the region of the measuring means 5 can practically speaking be disregarded as compared with that in the region of the measuring means 3.

The two flow measuring means 3 and 5, which are provided with central tappings, are connected to a voltage source 7 and to measuring and recording instrument 8 to form a bridge.

A filter 9 is interposed between the Brandtl tube 1 and the flow measuring means 3. The construction of this filter can be seen from FIG. 2. Between respective pairs of the retaining meshes 10a,10b, 10c and 10d there is arranged, in each case, a packing 11, 12 or 13 consisting of balls. These may conveniently be glass balls coated with a thin adhesive covering consisting, for instance, of petroleum jelly or grease. The diameters of the constituent balls in each set are the same and the diameter of the balls of the respective sets decreases in the direction of flow.

The apparatus operates in the following manner: If, owing to flow into the Brandtl tube 1, a pressure head is established, a gas flow proportional to the pressure head occurs in the tube 2 and disturbs the temperature equilibrium between the two halves of the measuring spiral 3, thus producing a corresponding change in the equilibrium or balance of the bridge, which is indicated by the instrument 8. While the flow to be measured has practically no effect on the comparison spiral 5, the disturbing flow effects compensate one another when the resistance to flow of the auxiliary circuit 4 is suitably adjusted by means of screws 14.

As the flow resistance does not depend on the inclination of the pressure tube, within the limits encountered in practice, it will be seen that it is possible to compensate in the manner described, also for the dependence of the thermal flow measuring means on inclination and thereby sustantially to facilitate the handling of the apparatus.

The flow resistance of the filter depends substantially only on the layer of balls of the smallest diameter, because the deposition of dust takes place first on the larger balls since the direction of flow is such that these are encountered first. For this reason, the flow resistance of the filter is independent with fairly wide limits of the dust charge on the balls, even with a fairly high dust charge in the atmosphere. The use of graded balls, with different diameter for the balls of each layer of the filter, makes it possible for the minimum flow resistance in each layer to be determined accurately, so that this can be taken into consideration without difficulty in setting the measuring arrangement 8.

The properties of the measuring apparatus shown in the drawings and described above in detail will appear from the following measurements.

At a velocity of 1 m./sec., the pressure head at the Brandtl tube is about 6 dynes/sq. cm. if the measuring apparatus is so designed that its resistance is such that at this differential pressure a transverse rate of flow of 5 cc./min. occurs through the flow measuring means, it is readily possible to obtain a sufficiently accurate final deflection or reading on a technical indicating or recording instrument. The electric power required for supplying the bridge in these circumstances is only 0.4 watt, which is inherently safe.

At a flow rate of 5 cc./min. using a filter comprising four layers of glass balls with diameters of 2.2, 1.1, 0.75 and 0.5 mm. respectively, with a layer thickness of 20 mm. in each case and diameter of 34 mm., the pressure is only 2 dynes/sq. cm., i.e. only one third of the pressure drop available. However, it has been found that the degree of deposition of the dust is more than 99.9%. Particles larger than $0.5\mu$ are separated quantitatively.

Of course, the invention is not limited to the particular constructional form which is shown diagrammatically in the drawings, but can be carried into effect in both stationary and portable measuring devices of the most diverse sizes.

What I claim is:

1. Apparatus for measuring the velocity of gas flow comprising:
    a main gas flow system, said system including a main gas flow passage for communication with the gas to be measured;
    a secondary gas flow system, said system including a secondary gas flow passage in spaced parallel relation to the main gas flow passage of said main gas flow system;
    a pair of spaced apart capillary passages providing communication between the main gas flow passage of said main gas flow system and the secondary gas flow passage of said secondary gas flow system;
    means for controlling the gas flow in the secondary gas flow passage of said secondary gas flow system;
    an electrical bridge circuit, said circuit including a first and a second resistance means connected in parallel to a source of electrical energy, the first resistance means being disposed to extend axially in the main gas flow passage of said main gas flow system and the second resistance means being disposed to extend axially in the secondary gas flow passage of said secondary gas flow system; and
    means connected across said bridge circuit at intermediate points of said conductors for sensing an unbalance of said electrical bridge circuit.

2. The invention defined in claim 1 wherein said means for controlling the gas flow and the secondary gas flow passage of said secondary gas flow system includes a threaded element disposed in the secondary gas flow passage to vary the restriction thereof.

3. The invention defined in claim 1, including a filter in said main gas flow system having a resistance to flow which is less than the resistance to flow of the main gas flow system.

4. The invention defined in claim 3, wherein said filter includes a plurality of separate layers of balls, said balls having adhesive coatings on the outer surfaces thereof, and said balls of the respective layers having their diameters decreasing from layer to layer in the direction of flow of gas therethrough.

References Cited by the Examiner

UNITED STATES PATENTS

| | | | |
|---|---|---|---|
| 1,229,842 | 6/1917 | Westcott | 73—200 X |
| 1,575,782 | 3/1926 | Mowry | 73—200 |
| 2,015,249 | 9/1935 | Benesh | 73—204 X |
| 2,297,408 | 9/1942 | Hardebeck | 73—202 |
| 2,624,199 | 1/1953 | Boyer | 73—204 X |
| 2,649,924 | 8/1953 | McIlvaine et al. | 55—512 X |
| 2,859,617 | 11/1958 | Adams | 73—204 |
| 2,947,938 | 8/1960 | Bennett | 73—204 X |
| 3,003,581 | 10/1961 | Greason | 55—524 X |

FOREIGN PATENTS

| | | |
|---|---|---|
| 617,942 | 2/1949 | Great Britain. |
| 769,465 | 3/1957 | Great Britain. |

RICHARD C. QUEISSER, *Primary Examiner.*

DAVID SCHONBERG, *Examiner.*

EDWARD D. GILHOOLY, *Assistant Examiner.*